US008200595B1

(12) United States Patent
De Zilwa et al.

(10) Patent No.: US 8,200,595 B1
(45) Date of Patent: Jun. 12, 2012

(54) DETERMINING A DISPOSITION OF SENSOR-BASED EVENTS USING DECISION TREES WITH SPLITS PERFORMED ON DECISION KEYS

(75) Inventors: Shane De Zilwa, Oakland, CA (US); William P. Groves, Bear, DE (US); Chiung-Chi Wang, El Cerrito, CA (US); Ramya Raghunathan, San Francisco, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 722 days.

(21) Appl. No.: 12/360,026

(22) Filed: Jan. 26, 2009

Related U.S. Application Data

(60) Provisional application No. 61/060,608, filed on Jun. 11, 2008.

(51) Int. Cl.
*G06F 17/00* (2006.01)
(52) U.S. Cl. ........................................................ 706/45
(58) Field of Classification Search .................... 706/12, 706/21, 45; 348/135, 142, 143, 148, 159
See application file for complete search history.

(56) References Cited

U.S. PATENT DOCUMENTS

| | | | | |
|---|---|---|---|---|
| 2002/0133721 | A1* | 9/2002 | Adjaoute | 713/201 |
| 2004/0073844 | A1* | 4/2004 | Unkle et al. | 714/39 |
| 2004/0107033 | A1* | 6/2004 | Rao et al. | 701/45 |
| 2004/0181441 | A1* | 9/2004 | Fung et al. | 705/7 |
| 2005/0096950 | A1* | 5/2005 | Caplan et al. | 705/7 |
| 2005/0273212 | A1* | 12/2005 | Hougen | 701/1 |
| 2008/0319614 | A1* | 12/2008 | Kuhn et al. | 701/45 |
| 2010/0076642 | A1* | 3/2010 | Hoffberg et al. | 701/29 |
| 2010/0332514 | A1* | 12/2010 | Steele et al. | 707/769 |

OTHER PUBLICATIONS

Graham, Service Oriented Business Rules Management Systems, Jun. 2005, MMV, pp. 1-75.*
Iwamoto, et al., Image Signal Robust to Caption Superposition for Video Sequence Indentification, 2006, IEEE, pp. 1-4.*
Hanjalic et al., Affective Video Content Representation and Modeling, 2005, IEEE, pp. 1-12.*

* cited by examiner

*Primary Examiner* — David Vincent
(74) *Attorney, Agent, or Firm* — Mintz, Levin, Cohn, Ferris, Glovsky and Popeo, P.C.

(57) ABSTRACT

Data characterizing a plurality of sensor generated events is received. Thereafter, analysis of the plurality of events is initiated using a decision tree with splits performed on decision keys. A first portion of the decision keys comprising analyst-selected splits can be derived from user-generated domain knowledge regarding a first plurality of historical events. A second portion of the decision keys comprising software-driven splits can be derived from a predictive model trained using a second plurality of historical events. Later, a disposition is determined for each event based on a traversal of at least one of the decision keys in the decision tree and such disposition is later initiated. Related apparatus, systems, techniques and articles are also described.

28 Claims, 9 Drawing Sheets

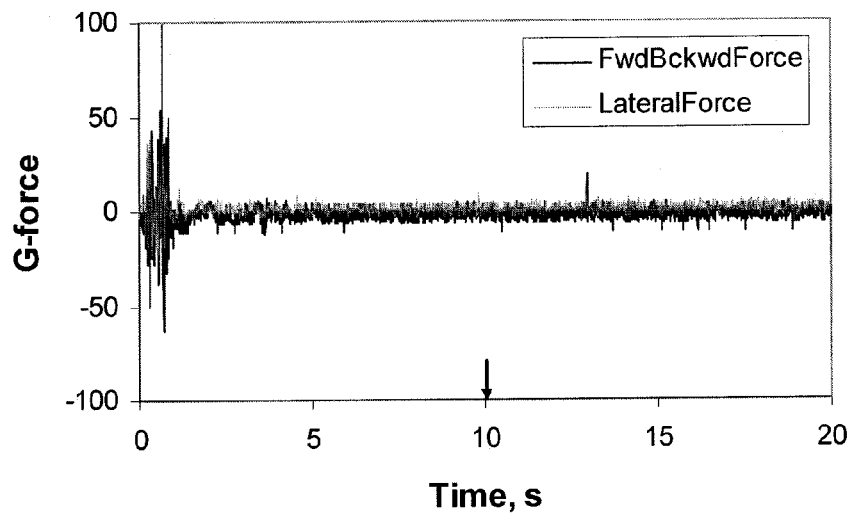
700
FIG. 7
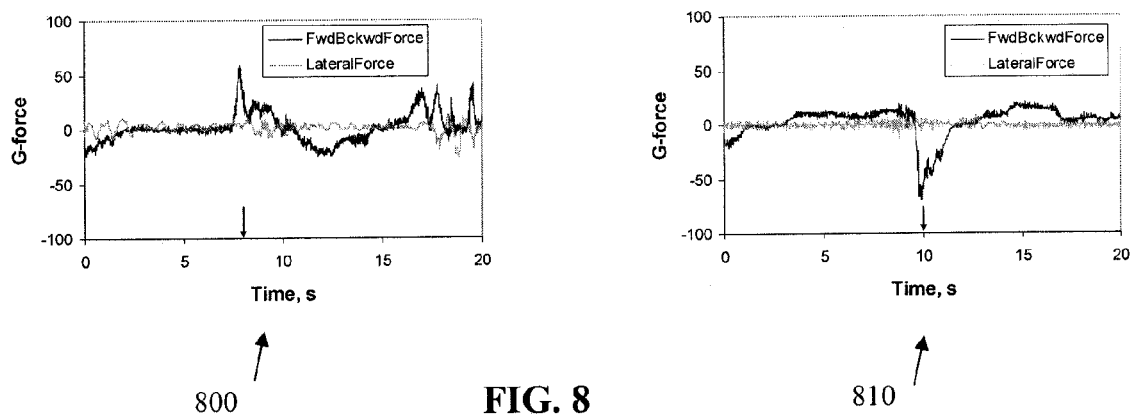
800　　FIG. 8　　810

DETERMING A DISPOSITION OF SENSOR-BASED EVENTS USING DECISION TREES WITH SPLITS PERFORMED ON DECISION KEYS

RELATED APPLICATION

This application claims priority to U.S. Pat. App. Ser. No. 61/060,608 filed on Jun. 11, 2008, the contents of which are hereby fully incorporated by reference.

TECHNICAL FIELD

The subject matter described herein relates to systems, techniques, and articles for handling sensor-based events.

BACKGROUND

Sensors are increasingly being deployed in a wide variety of fields in order to characterize performance of processes, equipment and/or operators of such processes and equipment. In certain cases, events identified or triggered by such sensors may be subject to further analysis such as human review to determine whether any secondary action needs to be taken in connection with the event. Automatically distinguishing between events that likely require secondary action and those that will likely not require secondary action can help reduce costs associated with monitoring a sensor array as well as shorten the amount of time required to initiate a secondary action for an event.

SUMMARY

Systems, methods, and articles are described for selectively determining how to handle sensor-generated events using a decision tree. Some dispositions may, for example, require a greater level of resources than other dispositions.

In one aspect, data characterizing a plurality of sensor generated events is received. Thereafter, analysis of the plurality of events is initiated using a decision tree with splits performed on decision keys. A first portion of the decision keys comprising analyst-selected splits can be derived from user-generated domain knowledge regarding a first plurality of historical events. A second portion of the decision keys comprising software-driven splits can be derived from a predictive model trained using a second plurality of historical events. Later, a disposition is determined for each event based on a traversal of at least one of the decision keys in the decision tree and such disposition is subsequently initiated.

The events can be generated from one or a plurality of sensors. Such sensors can transmit the data at regular intervals and/or when certain measurement thresholds are exceeded. The sensors can relate to a single piece of equipment, several related pieces of equipments, stages of a process, human assets and more. The data may relate solely to a single event or it may include data obtained in a time window before and/or after the event.

The predictive model can include, for example, one or more of a score card model, a neural network model, and a support vector machine model.

In some variations, data characterizing one or more associated events is sent, for example, via a computer network to a remote computer client associated with an analyst, if it was determined that one or more of the associated events requires review by the analyst. Thereafter, the analyst can review the data and determine what, if any, further actions need to be taken in connection with the event. In addition, there can be various levels of analyst review, with the more stringent levels requiring more data for the analyst to review in comparison with the other levels of review. For example, some levels might require an analyst to review a video clip while other levels might only require that the analyst review a still frame picture.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. By selectively determining sensor generated events requiring a greater level of review from events that require a lower level of review, fewer resources are required to monitor an array of sensors. For example, by reducing either the number of events that are subjected to human review, or the amount of data provided to an analyst conducting review (e.g., still frame vs. video clip), events can more efficiently be processed and/or reviewed.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 7 illustrates signal obtained from a sensor event characterized as a complex event;

FIG. 8 illustrates signal obtained from sensor events characterized as hard accelerations and hard braking events;

DETAILED DESCRIPTION

Figure 1:
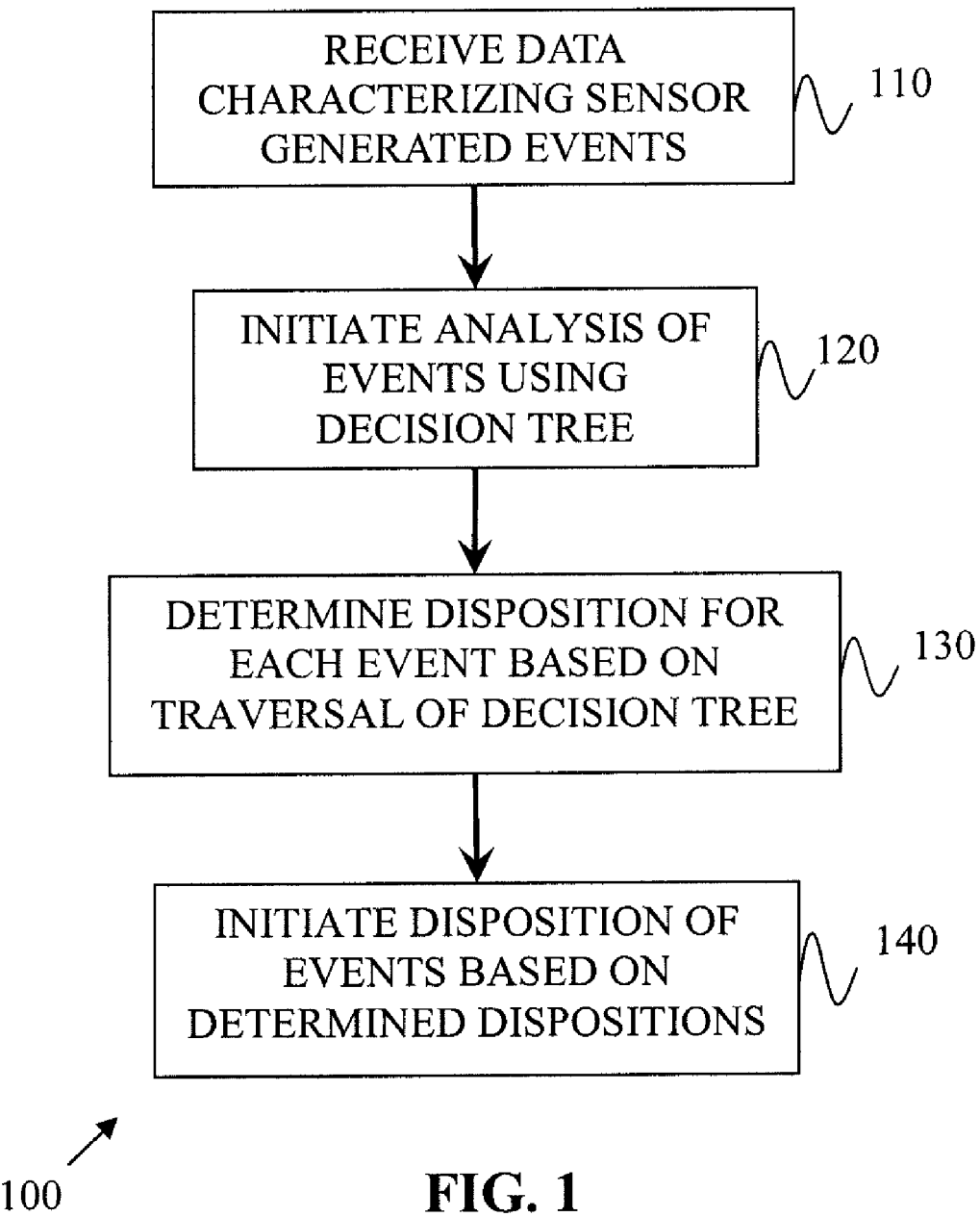
FIG. 1 is a process flow diagram illustrating a method for handling sensor generated events.

The automated decision tree-based risk classification processes described herein can be used for a wide variety of applications in which there are sensors that require monitoring for certain events. In a first example, camera monitoring is used to improve the training of fleet vehicles drivers. The cameras can be triggered by an 'event' (such as the forces on the vehicle exceeding a pre-determined threshold), and the recorded information examined to determine the driver behavior (if any) that contributed to the event. This information can then be used to provide targeted coaching to the driver with the intent of improving his/her driving behavior. With a large fleet, the time and cost associated with manually reviewing the clips becomes prohibitive. Instead, the current automated decision tree-based risk classification process can be used to identify high-risk events (those likely to be associated with bad driving behavior) based on factors such as rate of change of acceleration, duration of event, symmetry of forces, and amplitude and frequency of audio signal. These high-risk events can then be subjected to a detailed manual review. Events identified as low-risk (not likely to be associated with bad driving behavior) can be sent through an expedited review stream.

A second example relates to security camera monitoring of high-security facilities such as nuclear reactors, and facilities storing sensitive information. The cameras can be triggered by movement within a predefined sensitive area, and their images sent through a standard manual review process, for example by simultaneous manual examination of images from all the cameras. With a large facility, and many cameras, this standard process is costly, labor-intensive and, most importantly, error-prone. Therefore, the standard review process can be augmented with automated image processing coupled with the current automated decision tree-based risk classification process which can identify high-risk events (those likely to be associated with a security breach) based on a variety of factors including time and location of occurrence, and type of movement and behavior observed. These high-risk events can be sent for immediate manual review, taking priority over the standard process, thus increasing the likelihood that any security breaches will be detected.

A third example relates to remote sensors that are monitoring remote machinery (e.g., land-based gas turbines, mining equipment). For the most part these machines are expected to run without malfunctions and therefore, continuous manual monitoring would be unnecessarily labor-intensive and costly. Instead, the pressure signals could be sent through an automated decision tree-based risk classification process that alerts a human operator of increased risk events (associated with machinery malfunction occurs) based on factors such as frequency and amplitude of pressure fluctuations, machinery temperature, and ambient pollutant concentrations. The automated decision tree-based risk classification process can also indicate the likely malfunction enabling the operator to take the most appropriate action.

A fourth example relates to remote sensors that are monitoring network applications for a company such as a Application Service Provider (e.g., networks, software as a service). A large amount of data is provided each second and minute on the status of each server, application or hardware. Such data requires extensive manual review to identify potential risks. Using the automated decision tree-based risk classification process, the signal and update data can be filtered to identify imminent high risk events such as server failure, network outages, and application failures. The result could require human review and intervention or in certain circumstances an automated response such as a software patch or upgrade can be applied immediately to avoid the failure. The automated decision tree-based risk classification process can also indicate the likely malfunction enabling the operator to take the most appropriate action.

FIG. 1 is a process flow diagram illustrating a method 100, in which, at 110, data characterizing a plurality of sensor generated events is received. Thereafter, at 120, analysis of the plurality of events using a decision tree with splits performed on decision keys is initiated. A first portion of the decision keys can comprise analyst-selected splits derived from user-generated domain knowledge regarding a first plurality of historical events and a second portion of the decision keys can comprise software-driven splits derived from a predictive model trained using a second plurality of historical events. For each event, at 130, a disposition of such event is determined based on a traversal of at least one of the decision keys in the decision tree. Subsequently, at 140, disposition of the events based on the determined dispositions is initiated.

Figure 2:
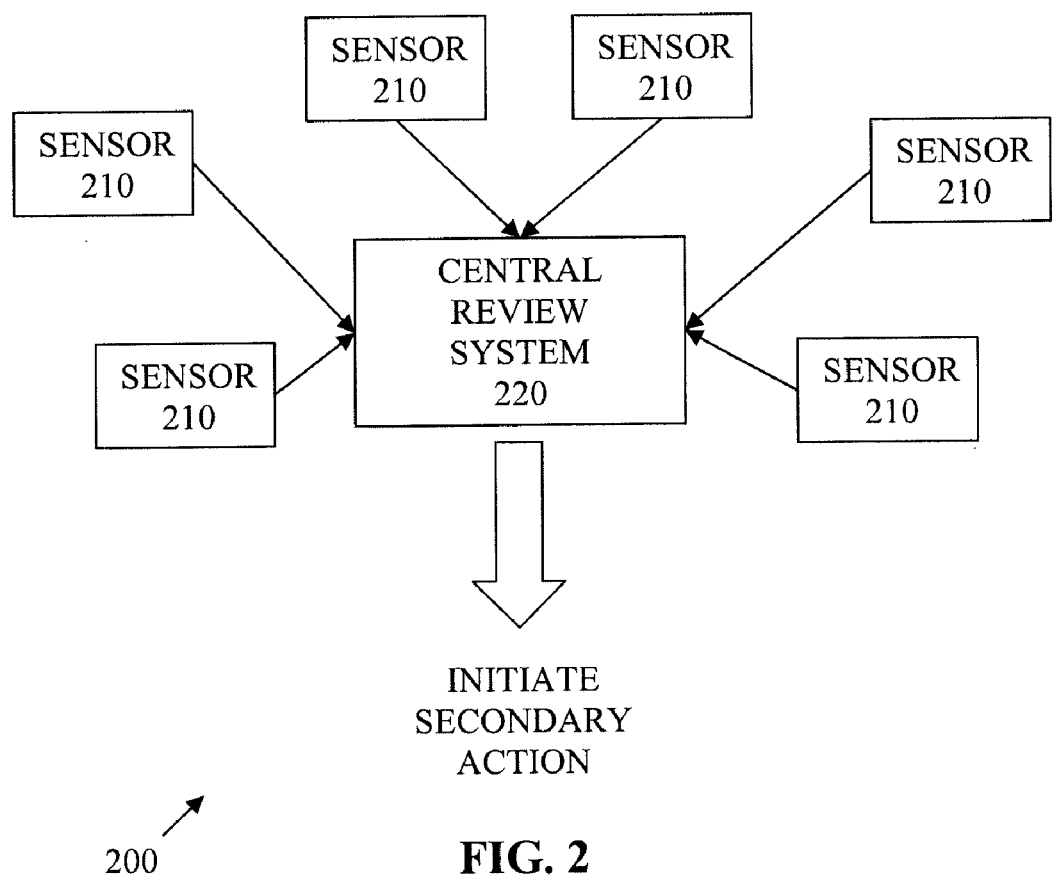
FIG. 2 illustrates a system of sensors in communication with a central review system.

FIG. 2 is a diagram of a system 200 in which there are a plurality of remote sensors 210 that are coupled to a central review system 220. References made herein to sensors can include a singular sensor or a series of sensors (e.g., a vehicle with multiple sensors). The remote sensors 210 periodically communicate (at regular or irregular intervals) with the central review system 220 to either provide raw data for further processing, pre-processed data relating to one or more events, and or a combination of both. For some events (whether identified by the sensors 210 directly or by the central review system 220), the central review system 220 can initiate secondary action in relation to the event. Secondary action in this context refers to any type of subsequent analysis or processing of data obtained from one or more of the sensors 210.

One application of the automated decision tree-based risk classification process is a process in which camera monitoring is used to improve the training of fleet vehicles drivers. The cameras can be triggered by an 'event' (such as the forces on the vehicle exceeding a pre-determined threshold), and the recorded information examined to determine the driver behavior (if any) that contributed to the event. This information can then be used to provide targeted coaching to the driver with the intent of improving his/her driving behavior.

With a large fleet, the time and cost associated with manually reviewing the clips becomes prohibitive. In this case, the automated decision tree-based risk classification process can be used to identify high-risk events (those likely to be associated with bad driving behavior) that can be subjected to a detailed manual review. Events identified as low-risk (not likely to be associated with bad driving behavior) can be sent through an expedited review stream.

In one example, camera systems can be installed on a plurality of vehicles. These cameras can be triggered when the forces on the vehicle (as detected, for example, by a g-force/inertial sensor, and hence on the camera, exceeds a pre-determined threshold. The camera systems can record data in the form of clips from a predefined interval prior and after they are triggered (e.g., 10 seconds prior to triggering and 10 seconds afterward). The recorded information can also include information from the various sensors mounted within the vehicle, including, for example, video, audio and g-force data. This information can then be sent wirelessly to a remote central review system (such as the central review system 220 of FIG. 2) where analysts review and analyze the clips to determine the driver behaviors (if any) that contributed to the 'event'. This information can then be used to provide coaching to the driver with the intent of improving his/her driving behavior.

Such a vehicular sensor system can reduce the time and cost associated with reviewing video clips sent to the central review system. A reduction in time and cost can be achieved by determining whether an event can be considered low risk and hence, be sent through an expedited review stream.

Video clips that are captured by the cameras can be assigned, for example, to two different analyst review streams (more than two streams can be implemented):

1. Events that are determined to likely be associated with bad driving behavior can be assigned to Standard Review. In this review mode, a single analyst can review the entire video, and these events are reviewed at the rate of 42 events per analyst per hour.
2. Events that are determined to likely be not associated with bad driving behavior can be assigned to Fast Review. This review mode is implemented by the analyst viewing a few still frames of the event, and these events are reviewed at a rate of approximately 500 events per analyst per hour.

In one implementation, prior to implementing the techniques described herein, 30% of all events are assigned to Fast Review, and of those events around 20% were subsequently passed to Standard Review based on the analyst observing a collision or risky driving behavior in the still frames.

The current subject matter provides a data-driven strategy to better determine whether an event can should be assigned to secondary actions such as Standard or Fast review. High-risk events (those that are likely to be associated with bad driving behavior) can be assigned to Standard Review, while low-risk events (those that are not likely to be associated with bad driving behavior) can be assigned to Fast Review.

The criteria developed for identifying high-risk and low-risk events can, for example, be as follows. Every event that enters the central review system is assigned an event trigger by the analyst. This is an indication of the type of event that caused the forces on the vehicle to exceed the threshold and trigger the camera. The event trigger can, for example, fall in to one of the six following categories which are listed in Table 1 in the order of decreasing frequency of occurrence:

TABLE 1

Table 1: Event triggers and frequency of occurrence.

| Event Trigger | % of events |
|---|---|
| Rough Road | 59.4 |
| Hard Braking | 21.7 |
| Hard Cornering | 11.3 |
| Other | 6.9 |
| Hard Acceleration | 0.5 |
| Collision | 0.2 |

Hard braking, hard cornering, hard acceleration and collisions can be characterized as high-risk events. Thus, these event can go through Standard Review so that they can be analyzed and scored in detail and steps taken based on this analysis to modify the driver's behavior. On the other hand, rough road and other events are low-risk events and can therefore be sent to Fast Review. In particular, because rough road events can sometimes account for nearly 60% of all the events generated by a vehicular sensor, identifying a large proportion of these rough road events and sending them through Fast Review results in a large saving of analyst time. One constraint can be that all collision events go to Standard Review as all collisions typically require review of some sort. The other event trigger is a category that can indicate camera malfunctions or events that happen while the vehicle is out of service.

The target of this strategy can be summarized as follows:
Maximize: the number of rough road events that go to Fast Review
Hard constraint: all collision events must go to Standard Review
Softer constraint: maximize number of hard acceleration, hard braking, and hard cornering events that go to Standard Review As shown in Table 2, ideally 100% of collisions and hard accelerations, brakings and cornerings will go through Standard Review, while substantially 100% of rough road events will go through Fast Review.

TABLE 2

Table 2: Ideal targets.

| Event Trigger | % going to Fast Review | % going to Standard Review |
|---|---|---|
| Hard Acceleration | 0 | 100 |
| Hard Braking | 0 | 100 |
| Hard Cornering | 0 | 100 |
| Collision | 0 | 100 |
| Rough Road | 100 | 0 |
| Other | — | — |

The other event triggers can be treated as follows. Those that are identified as being associated with camera malfunctions are sent to a special Fast review to deal with camera malfunctions. After all, camera malfunctions can require a very different action to be taken from events that are associated with driver behavior. The remaining other events which account for a small percentage of all events are not considered in the performance definition.

While sensors such as microphones recording audio data can, in some implementations be utilized. However, other sensors such as sensors that provide g-force data may provide sufficient data to make the determinations described herein. In some arrangements, two g-force components can be utilized, namely: (1) along the main length of the vehicle (forward-backward force); and (2) along the width of the vehicle (lateral force).

The current subject matter was developed, in part, using two separate datasets. The first dataset consisted of under 600 unique events, and is subsequently referred to as the smaller dataset. This data was sampled such that there are a similar number of events related to each event trigger. The solution strategy was initially built on this dataset and all the g-force signals that are used to illustrate this report are from this dataset. The second dataset consisted of over 18,000 unique events, and is subsequently referred to as the larger dataset. This data was randomly sampled from an even larger set of events and hence is believed to be more representative than the smaller dataset.

Figure 3:
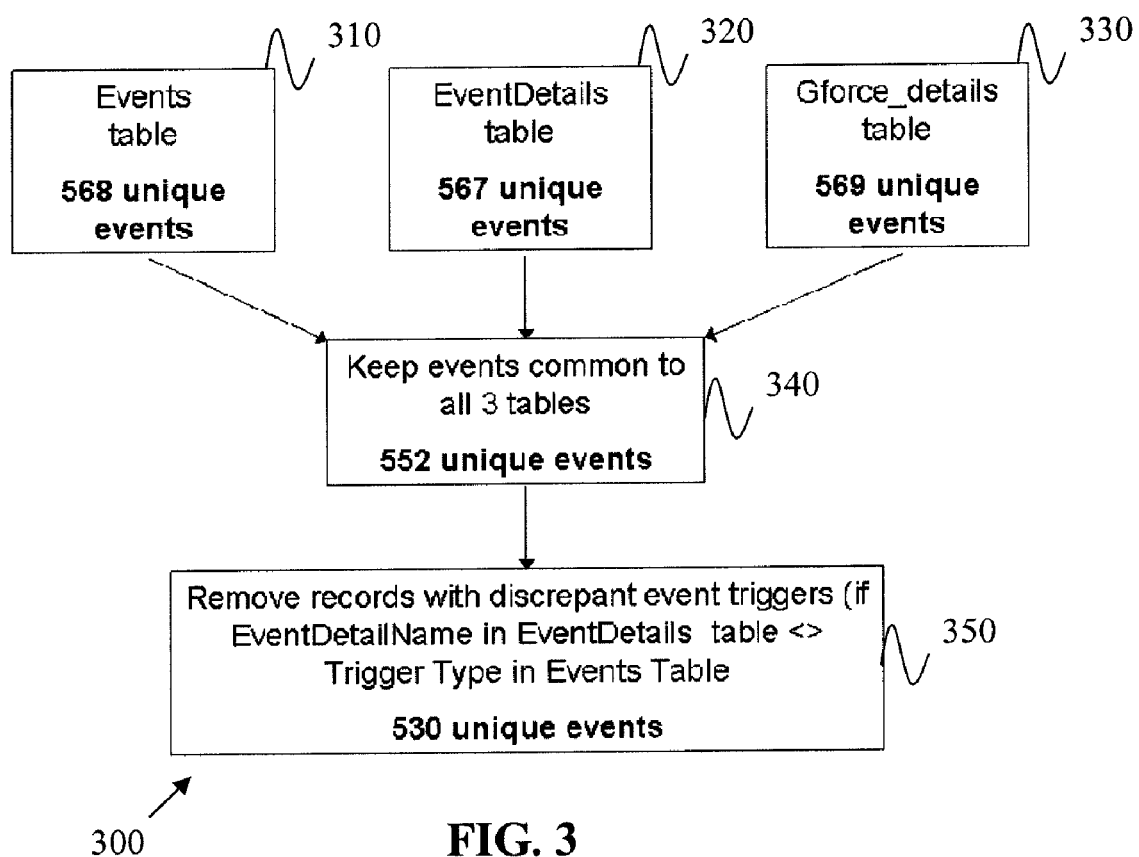
FIG. 3 illustrates a data preparation process for a first dataset.

The data preparation process that is used for the smaller dataset is illustrated in the diagram 300 of FIG. 3. Three data files 310, 320, 330 were used:
1. A file named Events table (310) consisted of 568 unique events and contained data pertaining to an event that is known prior to the event (e.g.: vehicle type, trigger threshold) as well as summary information obtained from the camera system (e.g.: trigger frame, maximum g-force). In addition this file also contained information about the event trigger.
2. A file named EventDetails table (320) consisted of 567 unique events and contains data pertaining to an event that is assigned by the analyst who reviewed the clip (e.g.: event trigger, outcome, details of driver behavior)
3. A file named Gforce_details table (330) consisted of 569 unique events and contains the forward-backward and lateral g-force components digitized at 100 Hz together with the corresponding time-stamp.

The first step 340 in the data preparation process can be to discard events that are not matched to all three data files 310, 320, 330. Applying this step in one example resulted in a dataset with 552 unique events. A second data cleansing step 350 can be to discard data that had discrepant descriptions of the event trigger in the Events table and EventDetails table files. Applying this second step 350 reduced the usable dataset to 530 unique events, and the solution was initially built using these 530 events.

Figure 4:
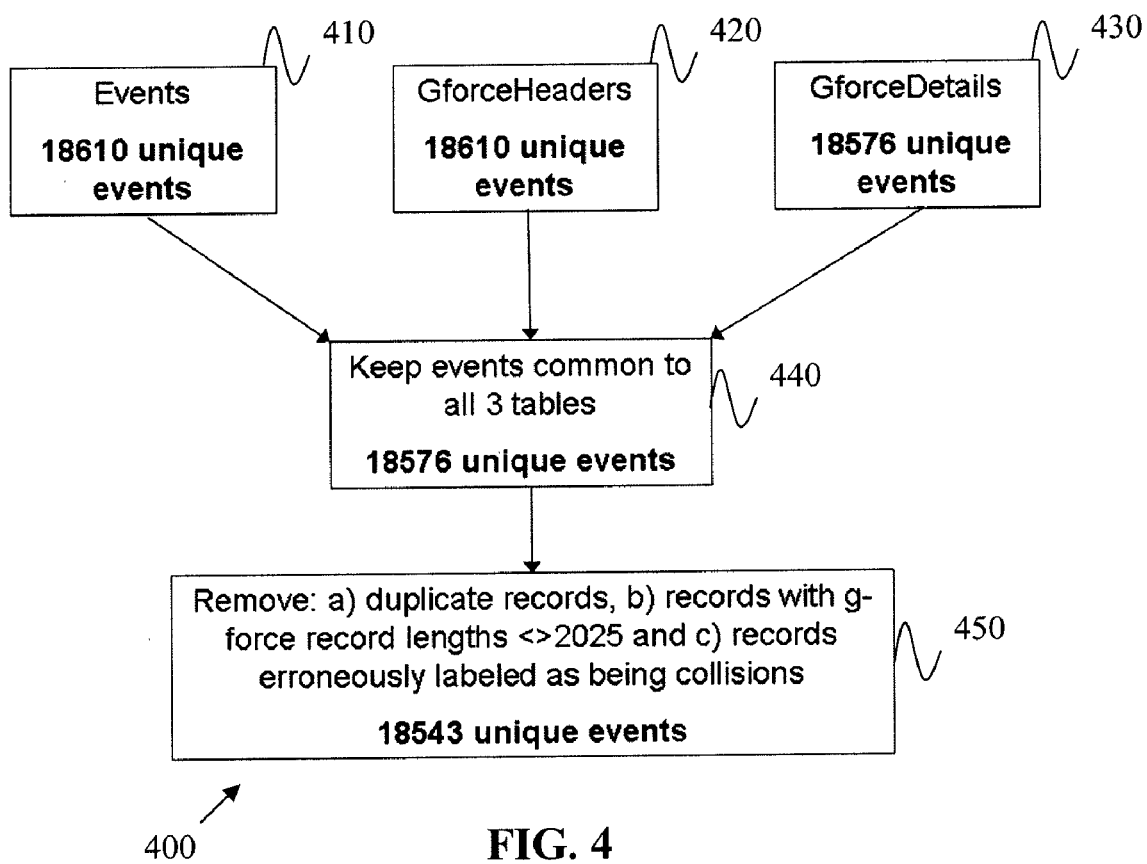
FIG. 4 illustrates a data preparation process for a second dataset.

A data preparation process that was used for the larger dataset is illustrated in the diagram 400 of FIG. 4. Three data files 410, 420, 430 were used:

1. A file named Events (410) consisted of 18610 unique events and contained information from HindSight. It contained data pertaining to an event that was known prior to the event (e.g., vehicle type, trigger threshold, etc.), as well as summary information obtained from the camera system (e.g., maximum g-force, etc.). In addition, this Events file 410 also contained information assigned by the analyst including event trigger and event score.
2. A file named GforceHeaders (420) consisted of 18610 unique events and contained g-force header information including trigger frame and total frame.
3. A file named GforceDetails table (430) consisted of 18576 unique events and contained forward-backward and lateral g-force components digitized at 100 Hz together with the corresponding time-stamp.

With the larger dataset, a first step 440 in the data preparation process was to discard events that were not matched to all three data files 410, 420, 430. Applying this first step 440 resulted in a dataset with 18576 unique events. A second data cleansing step 450 was to discard the 28 records that had duplicate matchkeys, as well as 2 records that had g-force signal lengths not equal to 2025. This led to the removal of 30 records, leaving 18546 unique events. Finally, three events had been labeled as being collisions, but closer examination showed that they were not collisions. These events were also removed from the dataset, leaving a usable dataset of 18543 unique events.

A solution strategy described herein can be a multi-level decision tree with branching or splits performed on predictive characteristics (referred to as decision keys) calculated from sensor data such as g-force data.

The decision keys and values on which they are split can be selected so that the end nodes of the tree are homogeneous (as possible) with respect to the review mode that the events at that end node should be assigned to. The decision tree can be built using, for example, ModelBuilder for Decision Trees (MB4DT), developed by Fair Isaac Corporation, which is a software application for building data-driven solution strategies. This software can help determine the most predictive decision keys and determine on what values these decision keys should be split in order to maximize the separation of the different event triggers.

MB4DT can allow an analyst to conveniently switch between performance definitions. This feature allowed considering, for example, the split that would best separate rough road events from the rest of the events, and then at how best to separate collisions from the rest. This ability to switch between performance definitions facilitates considering the problem from many angles before deciding on the optimum split.

There can, for example, two types of splits in the decision tree:

1. Analyst-selected splits: These can be splits based on domain knowledge and made, for example, with no input from the MB4DT software.
2. Software-driven splits: These can be splits where the decision key and in particular the value on which to split it is based, for example, on input from the MB4DT software.

Analyst-selected splits and predictive characteristics used for further differentiation between event trigger types using software-selected splits are described below.

Figure 5:
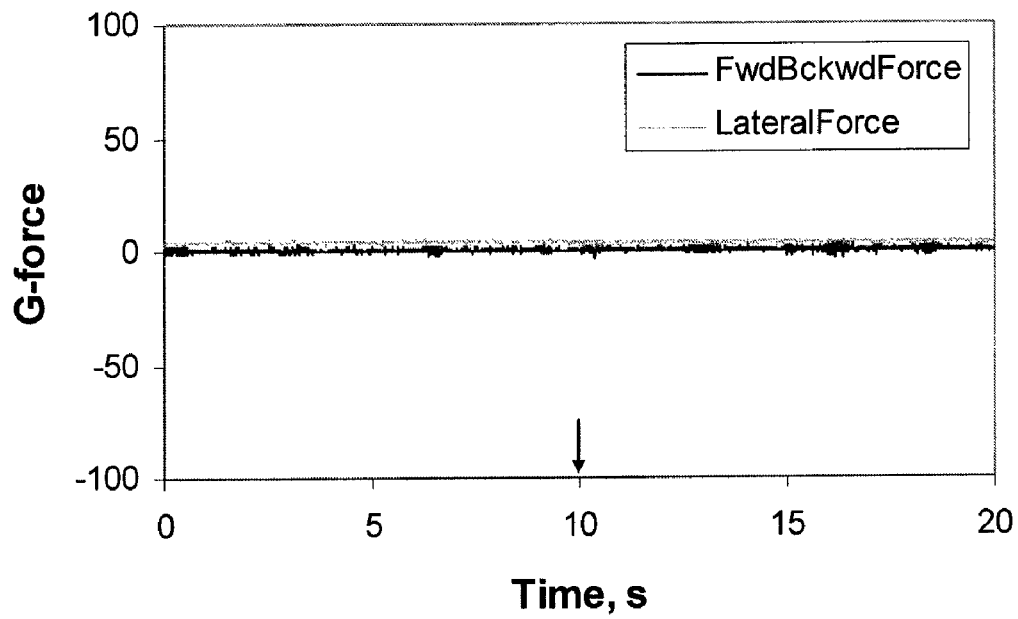
FIG. 5 illustrates signal obtained from a sensor event characterized as a camera malfunction.

A first analyst-selected split identified a camera malfunction. In particular, it identified events in which the forces did not exceed a pre-defined threshold in the entire 20 second record. Therefore, the camera should not have been triggered. The g-force signals from one such event are shown in the diagram 500 of FIG. 5.

Figure 6:
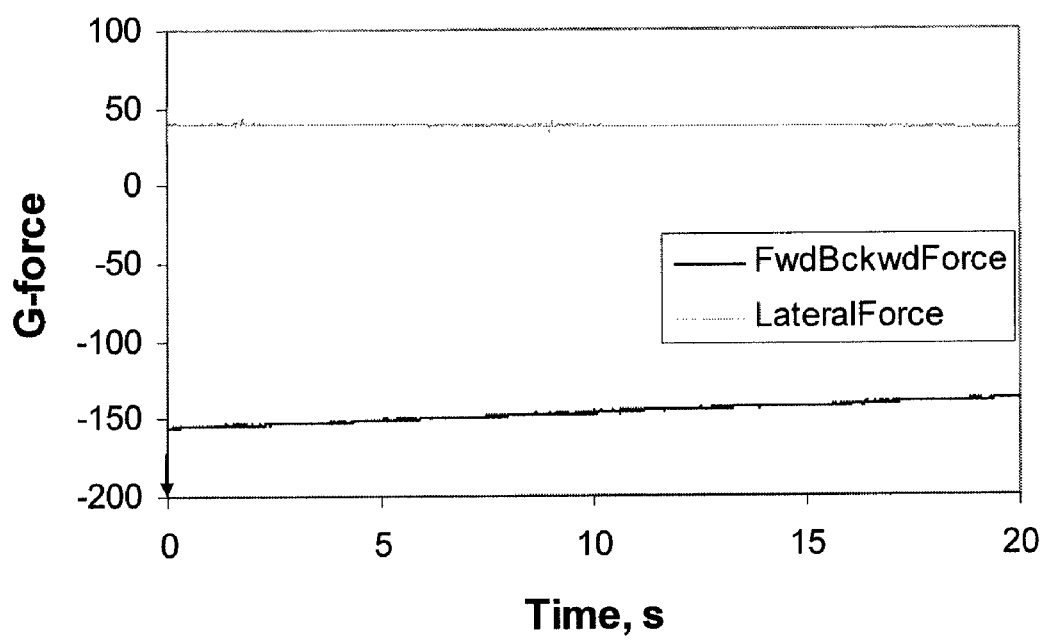
FIG. 6 illustrates signal obtained from a sensor event characterized as a camera malfunction.

A second analyst-selected split also identified a camera malfunction. In this case, it identified events where the g-force signal is higher than the threshold but is unvarying. The g-force signals from one such event are shown in the diagram 600 of FIG. 6. The g-force signal is not associated with any physical events, but rather with a camera malfunction. In the decision tree, this type of event can be identified by ensuring that the range between the extremes of the signal (peak-to-peak level of the more dominant force) is within a prescribed limit.

A third analyst-selected split identified a large event outside a trigger window. Most of the decision keys can be based on the g-force data in the trigger window, where the trigger window is defined as the 2 seconds before and the 2 seconds after the camera-assigned trigger frame. (In most cases the trigger occurs at the midpoint, the 10 s mark, of the recorded event, since the camera records the 10 seconds before and the 10 seconds after. However, when two events occur so close to each other that there is overlap between the time both events want to record, the second event can be triggered earlier in the 20 second window.) The decision keys can be based on the data in the trigger window in order to isolate the trigger event from large forces unrelated to the trigger.

In general the largest forces occur in the trigger window. However, there are some events where much larger forces occur outside the trigger window than inside it. This could occur due to mis-assigned trigger frame, i.e. missing a large surge in g-force and then triggering on a smaller event. Trigger frame mis-assignment can also result from the camera missing an event completely and the driver triggering the camera manually. The g-force signals from one such event is shown in the diagram 700 of FIG. 7. In the decision tree this type of event can be identified as events with maximum forces outside the trigger window greater than twice the maximum force within the window. Such events can be sent to Standard Review so that an analyst can review them in detail. In some implementations, these events can be tagged with a note warning the analyst to be attentive to the possibility that the trigger frame is mis-assigned or that there maybe multiple events in the video clip.

Two additional analyst-selected splits separate hard cornerings, from hard brakings from hard accelerations using the physics associated with these events. Accelerations are caused by a force on the vehicle acting in the forward direction. In contrast, brakings are caused by a force on the vehicle acting in the backward direction. Therefore, hard accelerations and brakings should be associated with positive and negative forward-backward forces, respectively, and this expectation is borne out by the signals illustrated in diagrams 800, 810 of FIG. 8.

An object that travels in circle at constant speed is acted on by a centripetal force in the direction of the center of the circular path. Therefore, a vehicle taking a corner will be subject to a lateral force. The consequent expectation that hard cornerings are associated with a lateral force is confirmed by the signals such as those shown in diagram 900 of FIG. 9.

The above information enables splits to be made to separate out hard cornerings, from hard brakings from hard accelerations. First, analyst-selected split four can look at whether the maximum magnitude of the forward-backward force or lateral force is larger. The branch with the larger forward-backward force will have all the hard accelerations and brakings, while that with the larger lateral force will have all the hard cornerings.

Then analyst-selected split five can be used on the branch with hard accelerations and brakings to separate these event types from each other. This split looks at whether the positive forward-backward or negative forward-backward force has the larger magnitude. The branch with the larger positive forces will have all the hard accelerations, while that with the larger negative forces will have all the hard brakings.

As described above, analyst-selected splits can be used to first identify and separate out camera malfunctions and complex events from the rest of the dataset. The remaining data can then be split into several major branches, for example: one with all the hard cornerings, one with all the hard brakings and one with all the hard accelerations, with all three branches containing some rough road and collision events. At this juncture, software-driven splits can be used to separate the rough road events from the collision events from the hard cornering/braking/acceleration events. Before obtaining input from the MB4DT software the typical g-force signals from the different events were examined to determine the characteristics that distinguished each of these events.

Figure 9:
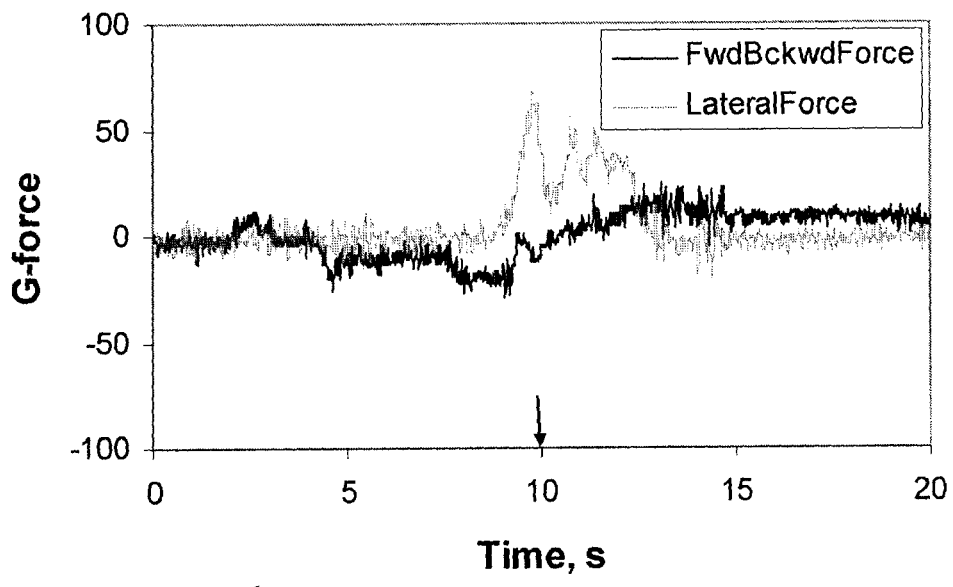
FIG. 9 illustrates signal obtained signal obtained from a sensor event characterized as a hard cornering event.

The g-force signal from a typical collision event is shown in the diagram 900 of FIG. 9, and as can be seen these events typically have extremely short durations. They also have relatively high forces. Thus a rate variable, that is essentially defined as maximum force divided by duration, can be a strong predictive characteristic of collision events.

Figure 10:
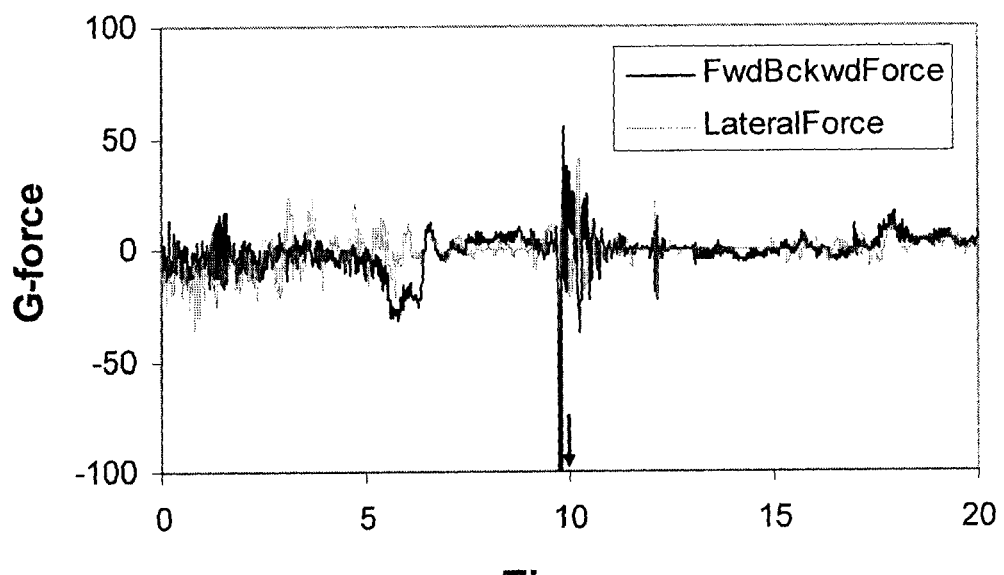
FIG. 10 illustrates signal obtained signal obtained from a sensor event characterized as a collision event.

Another important distinguishing characteristic of collision events are high peak-to-peak levels in the secondary direction, which is defined as the direction with the smaller maximum force. For example, in the diagram 1000 of FIG. 10, the larger forces are in the forward-backward direction and hence the secondary direction refers to the lateral direction.

Figure 11:
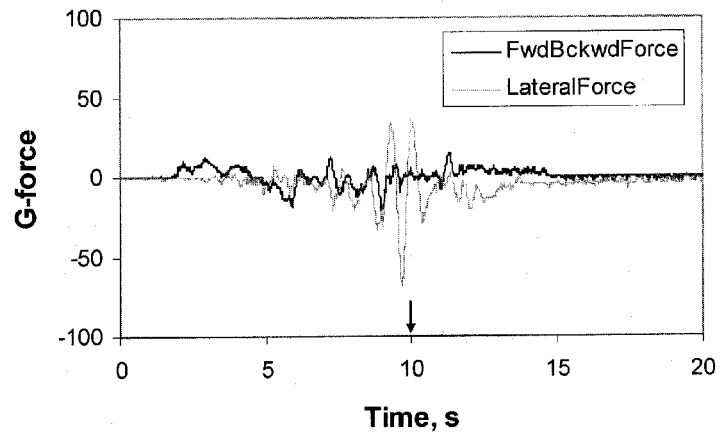
FIG. 11 illustrates signal obtained signal obtained from a sensor event characterized as a rough road event.

The g-force signal from a typical rough road event is shown in the diagram 1100 of FIG. 11. Rough road events typically have intermediate duration and rates. The most distinguishing characteristic of these events is symmetry, that is the magnitudes of the positive and negative forces are similar due to these events having no net acceleration.

Figure 12:
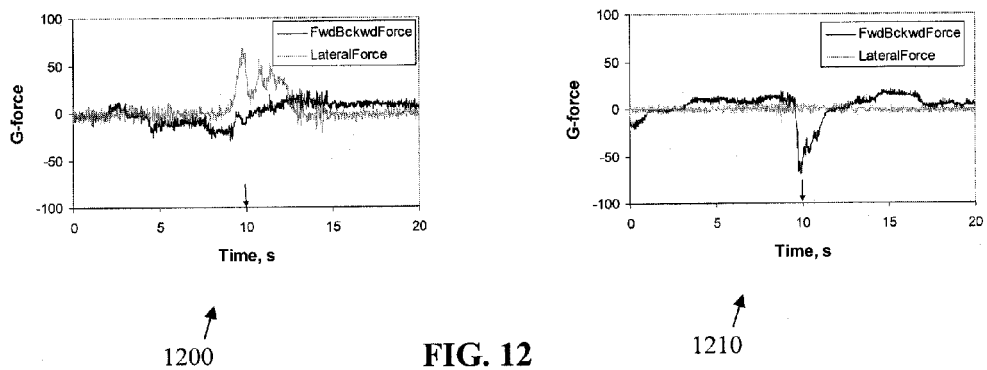
FIG. 12 illustrates signal obtained from sensor events characterized as hard cornering and hard braking events.

Hard cornering, braking, and acceleration events can have some similar characteristics to each other. In particular, they tend to be long duration events as seen from the signals from hard cornering and braking events as show in the diagrams 1200 (showing hard cornering), 1210 (showing hard braking) of FIG. 12. These events also tended to have low force levels and hence, low rates are a strong distinguishing characteristic of these events.

The distinguishing characteristics described above can be used in the decision tree to separate the rough road events from the collisions from the hard cornering/braking/acceleration events as follows:

The rate characteristics which are the most predictive can be used first. The collision events have the highest rates and the hard cornering/braking/acceleration events (depending on the branch) the lowest rates, hence the branches with the lowest and highest rates are assigned directly to Standard Review.

Then the branches with intermediate rates can be split on the symmetry characteristics. The most symmetric events are rough road events, and hence the branches with highest degree of symmetry are assigned directly to Fast Review.

Most of the remaining branches can then be subject to splits by peak-to-peak level in the secondary direction to further isolate collision events from rough road events.

A few branches which have had all collision events removed (because they were already split on low rate or low peak-to-peak levels in the secondary direction) still required differentiation between hard cornerings and rough roads. This was done using splits on maximum forces and/or peak-to-peak levels in the primary direction, with the hard cornerings going into the branches with lower values.

Many of the branches are completed by a tertiary split on duration. Collisions tended to be short duration events and so the shorter times were sent to Standard Review. Likewise the longest duration events were the hard cornering/braking/acceleration events so these were also sent to Standard review, with the intermediate branch being assigned to Fast Review.

The solution performance is illustrated in Table 3 below. The right-hand columns of the table quantify the performance of the proposed solution on the larger dataset. It can be seen that:

All collisions go to Standard Review.

There is little misclassification of hard acceleration and hard braking events with around 90% or more of these events going to Standard Review.

There is more significant misclassification of hard cornering events with only around 70% or more of these events going to Standard Review.

Most importantly, from the point of view of saving analyst time, 70% of rough road events go to Fast Review.

In all 48.8% of all events go to Fast Review.

TABLE 3

| Event Trigger | With Proposed Solution and Smaller Dataset | | With Proposed Solution and Larger Dataset | |
|---|---|---|---|---|
| | % going to Fast Review | % going to Standard Review | % going to Fast Review | % going to Standard Review |
| Hard Acceleration | 9.2 | 90.8 | 10.5 | 89.5 |
| Hard Braking | 3.2 | 96.8 | 4.4 | 95.6 |
| Hard Cornering | 43.4 | 56.6 | 30.8 | 69.2 |
| Collision | 0.0 | 100.0 | 0.0 | 100.0 |
| Rough Road | 79.6 | 20.4 | 70.1 | 29.9 |
| Other | 42.8 | 57.2 | 39.4 | 60.6 |

The left-hand columns of Table 3 quantify the performance of the proposed solution on the smaller dataset. The performance is similar in many aspects, but the most important statistic is that all collisions in this dataset are sent to Standard Review as well.

The proportion of rough road events in the test dataset that are sent to Fast Review could have been increased by using more aggressive and complex splits in the decision tree. However, reviewing collision events can be important events, and so in some implementations, the solution attempts to find a balance between being conservative with respect to sending all collision events to Standard Review and maximizing the rough road events sent to Fast Review. There can also be a significant tradeoff between sending hard cornering events to Standard Review and rough road events to Fast Review, and the proposed solution again attempts to find a balance between these two competing requirements.

Each of the events can be assigned a score by the analyst who reviewed the event. Sample score distribution for the events in the larger dataset that were assigned to Fast Review are shown in Table 4.

TABLE 4

| | % of Events going to Fast Review | | |
|---|---|---|---|
| Event Trigger | Score = 0 | Score = 1 to 3 | Score = 4+ |
| Hard Acceleration | 88.9 | 11.1 | 0.0 |
| Hard Braking | 77.8 | 18.8 | 3.4 |
| Hard Cornering | 81.8 | 14.9 | 3.3 |
| Collision | N/A | N/A | N/A |
| Rough Road | 74.4 | 23.6 | 2.0 |
| Other | 97.3 | 2.4 | 0.3 |
| ALL | 76.1 | 21.9 | 2.0 |

The score distribution shown in Table 4 provides an indication of the proportion of events that can initially be assigned to Fast Review that are likely to be subsequently assigned to Standard Review. For example, if it is assumed that all events with scores greater than 0 are kicked back to Standard Review, it can be estimated that 24% of events initially assigned to Fast review are eventually kicked back to Standard review. Similarly, if it is assumed that all events with scores greater than or equal to 4 are kicked back to Standard Review, the proportion kicked back is only 2%. In most implementations, the proportion of events that get kicked back to Standard Review is likely to be in between these two extremes.

Figure 13:
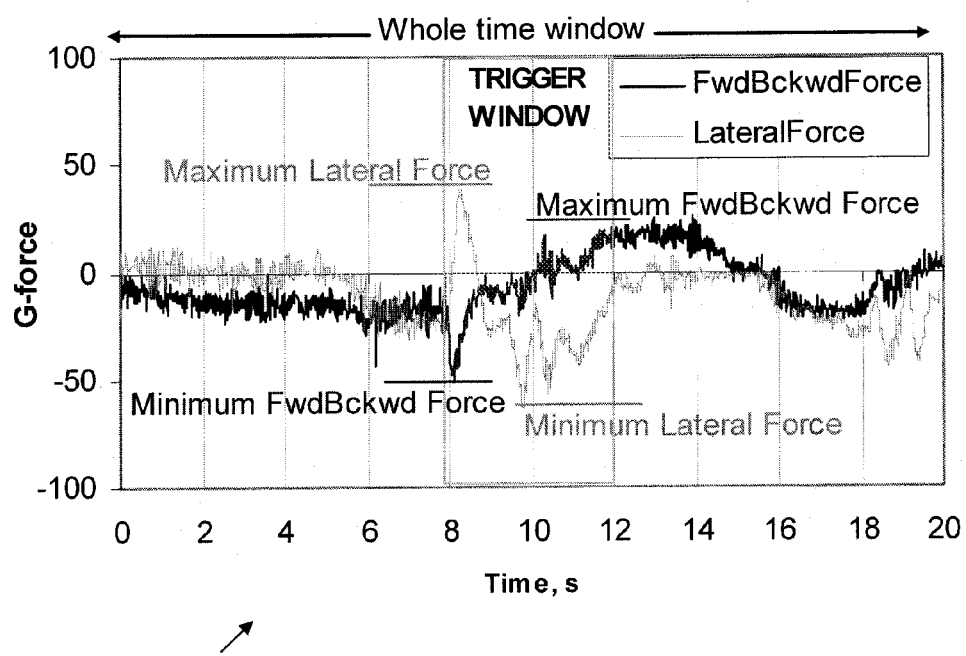
FIG. 13 illustrates a time window for an event.

FIG. 13 is a diagram 1300 that characterizes maximum and minimum forces in a trigger window and not in the whole time window. In some implementations, the trigger window is usually the 2 seconds immediately prior to and after the trigger. In cases where the assigned trigger frame occurs less than 2 seconds after the start of the recorded 20 second window, then the trigger window is whatever time is available before the trigger plus the 2 seconds after the trigger.

Considered decision keys are listed below, with those that are used in the final tree in bold. The definitions of the decision keys and any important notes that should be considered when coding these decision keys are also included.

Validity: is absolute maximum force anywhere in the whole time window>assigned trigger threshold.
If Yes, Validity=1
If No, Validity=0
EventOTWX2: is 2 absolute maximum force in the trigger window<absolute maximum force outside the trigger window
If Yes, EventOTW=1
If No, EventOTW=0
  MaximumFwdBckwdForce: defined in FIG. 12
  MinimumFwdBckwdForce: defined in FIG. 12
  MaximumLateralForce: defined in FIG. 12
  MinimumLateralForce: defined in FIG. 12
  MaxAbsFwdBckwdForce=Max[abs(MaximumFwdBckwdForce),abs(MinimumFwdBckwdForce)]
  MaxAbsLateralForce=Max[abs(MaximumLateralForce), abs(MinimumLateralForce)]
  DifMaxAbsForce: is MaxAbsFwdBckwdForce>MaxAbsLateralForce
If Yes, DifMaxAbsForce=1
If No, DifMaxAbsForce=0
  AccOrDec: is abs(MaximumFwdBckwdForce)>abs(MinimumFwdBckwdForce)
If Yes, AccOrDec=1
If No, AccOrDec=0
  PkToPkFwdBckwd=MaximumFwdBckwdForce−MinimumFwdBckwdForce
  PkToPkLateral=MaximumLateralForce−MinimumLateralForce
  FwdBckwdTimeAbovellalfThresh=time in trigger window where absolute forward-backward force>25 (note: FwdBckwdTimeAboveHalfThresh and LateralTimeAboveHalfThresh are measured in number of occurrences. Since the g-force is digitized at 100 Hz, there are 100 occurrences per second. So for example, a FwdBckwdTimeAboveHalfThresh value of 200 indicates an actual time of 2 seconds).
  LateralTimeAboveHalfThresh=time in trigger window where absolute lateral force>25
  FwdBckwdRate=(MaxAbsFwdBckwdForce−25)*100/FwdBckwdTimeAboveHalfThresh (note: FwdBckwdRate does have invalid values for the cases where FwdBckwdTimeAboveHalfThresh is 0. However, in the decision tree FwdBckwdRate is only used on the branches where MaxAbsFwdBckwdForce>MaxAbsLateralForce and so in the tree the invalid values of this variables are never considered. The same is true for Lateral rate).
  LateralRate=(MaxAbsLateralForce−25)*100/LateralTimeAboveHalfThresh
  AbsAccOrDec=abs[abs(MaximumFwdBckwdForce)−abs(MinimumFwdBckwdForce)]
  AbsLateralAccOrDec=abs[abs(MaximumLateralForce)−abs(MinimumLateralForce)]
  PctAbsAccOrDec=AbsAccOrDec/MaxAbsFwdBckwdForce
  PctAbsLateralAccOrDec=AbsLateralAccOrDec/MaxAbsLateralForce Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer-implemented method comprising:
   receiving data characterizing a plurality of sensor generated events;
   initiating analysis of the plurality of events using a decision tree with splits performed on decision keys, a first portion of the decision keys comprising analyst-selected splits derived from user-generated domain knowledge regarding a first plurality of historical events, a second portion of the decision keys comprising software-driven splits derived from a predictive model trained using a second plurality of historical events;
   determining, for each event, a disposition of such event based on a traversal of at least one of the decision keys in the decision tree; and
   initiating disposition of the events based on the determined dispositions.

2. A method as in claim 1, wherein the predictive model is selected from a group consisting of: a score card model, a neural network model, and a support vector machine model.

3. A method as in claim 1, wherein the data is derived from a single sensor.

4. A method as in claim 1, wherein the data is derived from a plurality of sensors, and wherein at least one of the sensors comprises a video camera mounted in or on a vehicle.

5. A method as in claim 4, wherein the plurality of sensors are used to monitor performance of equipment.

6. A method as in claim 4, wherein the plurality of sensors are used to monitor various stages of a process.

7. A method as in claim 1, further comprising:
   sending data characterizing one or more associated events to a client associated with an analyst if it was determined that one or more of the associated events requires review by the analyst.

8. A method as in claim 7, further comprising:
   receiving user-generated input from the analyst characterizing the associated events.

9. A method as in claim 1, wherein the data characterizing the plurality of sensor generated events is received at substantially regular intervals.

10. A method as in claim 1, wherein the data characterizing the plurality of sensor generated events is received after a corresponding sensor measures an event exceeding a pre-defined threshold.

11. A method as in claim 1, wherein the data characterizing the plurality of sensor generated events includes data within a pre-defined window before and after an event detected by the corresponding sensor.

12. A method as in claim 1, wherein the data characterizing the plurality of sensor generated events is wirelessly transmitted from the corresponding sensors.

13. A method as in claim 1, wherein the determining comprises:
   identifying events requiring a first level of review; and
   identifying events requiring a second level of review, the second level of review being less stringent than the first level of review.

14. A method as in claim 13, wherein the first level of review requires a human operator to interpret a first amount of data associated with the event, and the second level of review requires a human operator to interpret a second amount of data associated with the event, the first amount of data associated with the event being substantially larger than the second amount of data associated with the event.

15. An article comprising a non-transitory machine-readable medium embodying instructions that when performed by one or more machines result in operations comprising:
   receiving data characterizing a plurality of sensor generated events collectively characterizing operation of a vehicle, at least one of the sensors being a video camera and at least one of the sensors being an inertia sensor;
   initiating analysis of the plurality of events using a decision tree with splits performed on decision keys, a first portion of the decision keys comprising analyst-selected splits derived from user-generated domain knowledge regarding a first plurality of historical events, a second portion of the decision keys comprising software-driven splits derived from a predictive model trained using a second plurality of historical events;
   determining, for each event, a disposition of such event based on a traversal of at least one of the decision keys in the decision tree; and
   initiating disposition of the events based on the determined dispositions.

16. An article as in claim 15, wherein the predictive model is selected from a group consisting of: a score card model, a neural network model, and a support vector machine model.

17. An article as in claim 1, wherein the data is derived from a single sensor.

18. An article as in claim 1, wherein the data is derived from a plurality of sensors.

19. An article as in claim 18, wherein the plurality of sensors are used to monitor performance of equipment.

20. An article as in claim 18, wherein the plurality of sensors are used to monitor various stages of a process.

21. An article as in claim 15, further embodying instructions that when performed by one or more machines result in operations comprising:
   sending data characterizing one or more associated events to a client associated with an analyst if it was determined that one or more of the associated events requires review by the analyst.

22. An article as in claim 21, further embodying instructions that when performed by one or more machines result in operations comprising:
   receiving user-generated input from the analyst characterizing the associated events.

23. An article as in claim 15, wherein the data characterizing the plurality of sensor generated events is received at substantially regular intervals.

24. An article as in claim 15, wherein the data characterizing the plurality of sensor generated events is received after a corresponding sensor measures an event exceeding a pre-defined threshold.

25. An article as in claim 15, wherein the data characterizing the plurality of sensor generated events includes data within a pre-defined window before and after an event detected by the corresponding sensor.

26. An article as in claim 15, wherein the data characterizing the plurality of sensor generated events is wirelessly transmitted from the corresponding sensors.

27. An article as in claim 15, wherein the determining comprises:
   identifying events requiring a first level of review; and
   identifying events requiring a second level of review, the second level of review being less stringent than the first level of review.

28. An article as in claim 27, wherein the first level of review requires a human operator to interpret a first amount of data associated with the event, and the second level of review requires a human operator to interpret a second amount of data associated with the event, the first amount of data associated with the event being substantially larger than the second amount of data associated with the event.

* * * * *